(12) United States Patent
Fukutani et al.

(10) Patent No.: US 11,027,475 B2
(45) Date of Patent: Jun. 8, 2021

(54) SCREW-TYPE EXTRUDER

(71) Applicant: KOBE STEEL, LTD., Hyogo (JP)

(72) Inventors: Kazuhisa Fukutani, Hyogo (JP);
Kosuke Higashi, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 327 days.

(21) Appl. No.: 16/091,815

(22) PCT Filed: Apr. 12, 2017

(86) PCT No.: PCT/JP2017/014930
§ 371 (c)(1),
(2) Date: Oct. 5, 2018

(87) PCT Pub. No.: WO2017/183531
PCT Pub. Date: Oct. 26, 2017

(65) Prior Publication Data
US 2019/0160722 A1    May 30, 2019

(30) Foreign Application Priority Data

Apr. 20, 2016 (JP) .............................. JP2016-084212

(51) Int. Cl.
*B22C 5/00* (2006.01)
*B29C 48/395* (2019.01)
(Continued)

(52) U.S. Cl.
CPC .............. *B29C 48/395* (2019.02); *B29B 7/42* (2013.01); *B29B 7/424* (2013.01); *B29B 7/48* (2013.01);
(Continued)

(58) Field of Classification Search
CPC ... B29C 48/60; B29C 48/2564; B29C 48/385; B29C 48/25; B29C 48/256;
(Continued)

(56) References Cited

U.S. PATENT DOCUMENTS 3,082,816 A * 3/1963 Skidmore ............... B29C 48/76
159/49
5,004,352 A * 4/1991 Tamura .................... B29C 48/56
366/343

(Continued)

FOREIGN PATENT DOCUMENTS

CN        101259749 A     9/2008
CN        202573075 U    12/2012
(Continued)

OTHER PUBLICATIONS

Author: Lei Ming Title: Wear plate, rotary drill piece, helical body, and manufacturing method for helical body Date: Aug. 27, 2019 document named "CN110171672A_desc_en" (Year: 2019).*

(Continued)

*Primary Examiner* — Anshu Bhatia
*Assistant Examiner* — Greg Huan
(74) *Attorney, Agent, or Firm* — Studebaker & Brackett PC

(57) ABSTRACT

A screw extruder which extrudes a kneaded material includes a screw having a helical flight provided on an outer peripheral surface of a shaft portion thereof, and a chamber housing the screw. In the screw extruder, a flight thickening portion is provided at a part which is a tip portion of the flight and is on the reverse side of a rotation direction of the flight.

12 Claims, 3 Drawing Sheets

(51) Int. Cl.
    *B29B 7/48*     (2006.01)
    *B29B 7/42*     (2006.01)
    *B29C 48/80*     (2019.01)
    *B29B 7/74*     (2006.01)
    *B29C 48/60*     (2019.01)
    *B29C 48/385*     (2019.01)
    *B29C 48/59*     (2019.01)
    *B29C 48/35*     (2019.01)
    *B29C 48/525*     (2019.01)
    *B29L 7/00*     (2006.01)

(52) U.S. Cl.
    CPC ............ *B29B 7/489* (2013.01); *B29B 7/7495* (2013.01); *B29C 48/60* (2019.02); *B29C 48/80* (2019.02); *B29C 48/35* (2019.02); *B29C 48/385* (2019.02); *B29C 48/525* (2019.02); *B29C 48/59* (2019.02); *B29L 2007/002* (2013.01)

(58) Field of Classification Search
    CPC ......... B29C 48/395; B29C 48/80; B29B 7/42; B29B 7/7495; B29L 37/42; B29L 37/7495; B29L 2007/002
    See application file for complete search history.

(56) References Cited

U.S. PATENT DOCUMENTS

| | | |
|---|---|---|
| 5,232,280 A | 8/1993 | Moriyama |
| 5,843,489 A | 12/1998 | Nakano |
| 2003/0137894 A1 | 7/2003 | Reisenhofer et al. |
| 2005/0219943 A1 | 10/2005 | Yamane et al. |
| 2005/0249030 A1 | 11/2005 | Williams |
| 2008/0069916 A1 | 3/2008 | Regalia |
| 2008/0181051 A1 | 7/2008 | Yamaguchi et al. |
| 2015/0117134 A1 | 4/2015 | Ozawa et al. |

FOREIGN PATENT DOCUMENTS

| | | | |
|---|---|---|---|
| CN | 110171672 A | * | 8/2019 |
| EP | 0487076 A2 | | 5/1992 |
| EP | 0808705 A1 | | 11/1997 |
| GB | 2001898 A | | 2/1979 |
| IT | PR20080068 A1 | | 4/2010 |
| JP | S57-080037 A | | 5/1982 |
| JP | S59-124111 U | | 8/1984 |
| JP | H09-300433 A | | 11/1997 |
| JP | 2005-280254 A | | 10/2005 |
| KR | 860000872 Y1 | | 5/1986 |
| TW | 201347850 A | | 12/2013 |

OTHER PUBLICATIONS

International Search Report issued in PCT/JP2017/014930; dated May 30, 2017.

Written Opinion issued in PCT/JP2017/014930; dated May 30, 2017.

Extended European Search Report issued by the European Patent Office dated Oct. 29, 2019, which corresponds to EP17785870.1-1014 and is related to U.S. Appl. No. 16/091,815.

* cited by examiner

SCREW-TYPE EXTRUDER

TECHNICAL FIELD

The present invention relates to a screw extruder that extrudes a kneaded material.

BACKGROUND ART

A process of automobile tire manufacture uses an extrusion molding machine that is placed below a kneader which kneads rubber as the material of the tires and molds the rubber (kneaded material) fed from the kneader into a sheet form while continuously extruding it. As a technology related to the extrusion molding machine of this type, for example, a technology described in Patent Document 1 described below is cited. The technology described in Patent Document 1 is a technology related to a screw constituting the above-described extrusion molding machine. Inside a core portion and flight portion of the screw, a flow channel which circulates a medium such as water is provided, and by allowing the above-mentioned medium having adjusted temperature to flow in this flow channel, the overall temperature of the screw including the flight portion is evenly controlled to thereby prevent the kneaded material from adhering to the screw surface.

In recent years, there have been increasing demands for fuel-efficient tires. For the rubber as the material of fuel-efficient tires, silica is frequently compounded at a high rate. There is a problem that the rubber (kneaded material) having silica at a high rate is difficult to be molded into a sheet form by the extrusion molding machine. For this reason, it is desired to enhance the dispersion mixing property of the rubber (kneaded material) not only in the kneader of the upstream side process but also in the extrusion molding machine. To enhance the dispersion mixing property of the rubber (kneaded material), it is necessary to apply more energy to the kneaded material.

As a technology related to a screw constituting an extrusion molding machine that can enhance the dispersion mixing property of the rubber, for example, a technology described in Patent Document 2 shown below is cited. Patent Document 2 describes that the torsion angle of the flight portion constituting the screw is decreased and the overall thickness of the flight portion is increased.

PRIOR ART DOCUMENTS

Patent Documents

Patent Document 1: P-A-H09-300433
Patent Document 2: US 2008/0069916 A1

SUMMARY OF THE INVENTION

Technical Problems

However, regarding the change in the torsion angle of the flight portion in the middle, the processing thereof is difficult. Moreover, when the flight portion is designed so as to be overall thick, processing such as bending and cutting of the flight portion is difficult. As described above, the decrease of the torsion angle of the flight portion and the increase of the overall thickness of the flight portion make screw manufacture difficult.

The present invention is made in view of the above-mentioned circumstances, and an objective thereof is to provide a screw extruder including a screw having a structure that is capable of enhancing the dispersion mixing property of the kneaded material and easy to be manufactured.

Solution to Problems

The screw extruder in the present invention is a screw extruder which extrudes a kneaded material, including: a screw having a helical flight provided on an outer peripheral surface of a shaft portion thereof; and a chamber housing the screw. In the screw extruder, a flight thickening portion is provided at a part which is a tip portion of the flight and is on the reverse side of a rotation direction of the flight.

According to this structure, the distance of the gap in the rotation direction of the flight between the tip portion of the flight and the inner surface of the chamber is long. Since the shearing force is applied to the kneaded material for a long time in this gap portion, the energy applied to the kneaded material is increased, so that the dispersion mixing property is enhanced. If only application of the shearing force to the kneaded material for a longer time than before is performed, the flight thickening portion may be provided on the obverse side of the rotation direction of the flight tip portion. However, in the present invention, the flight thickening portion is provided on the reverse side of the rotation direction of the flight tip portion. The kneaded material can be made to more smoothly flow into the gap between the flight tip portion and the inner surface of the chamber than the case where the flight thickening portion is provided on the obverse side of the rotation direction of the flight tip portion. Consequently, the amount of kneaded material that flows into the gap between the flight tip portion and the inner surface of the chamber and receives the shearing force (is kneaded) is increased.

Not the entire flight is made thick as in the conventional art but a part of the flight is made thick, and thus, the manufacture is easier than the conventional art.

In addition, in the present invention, it is preferred that: an outer peripheral surface of the tip portion where the flight thickening portion is provided is formed in an arc shape in the rotation direction of the flight; and at least a part of an inner wall surface of the chamber has an arc shape so that a gap having a uniform dimension is formed between the at least a part of an inner wall surface of the chamber and the outer peripheral surface of the tip portion including the flight thickening portion.

According to this structure, since the kneaded material smoothly flows into the gap between the flight tip portion and the inner surface of the chamber, the amount of kneaded material that flows into the gap between the flight tip portion and the inner surface of the chamber and receives the shearing force (is kneaded) is further increased.

In addition, in the present invention, it is preferred that the flight thickening portion decreases in thickness toward a center side of the shaft portion.

According to this structure, the kneaded material can be prevented from accumulating on the reverse side of the rotation direction of the flight. Thus, deterioration of the kneaded material can be prevented.

In addition, in the present invention, it is preferred that: the chamber includes a chamber upstream portion including, at a top portion thereof, a kneaded material supply port, and a chamber downstream portion having a periphery surrounded by a wall surface; and the part including the flight thickening portion in the flight is disposed in the chamber downstream portion.

According to this structure, the gap where the kneaded material escapes is fewer in the chamber downstream portion having its periphery surrounded by the wall surface than in the chamber upstream portion including; at the top portion, the kneaded material supply port, and thus, the kneading effect can be enhanced by disposing, in the chamber downstream portion, the part including the flight thickening portion in the flight.

In addition, in the present invention, it is preferred that the part of the flight disposed in the chamber downstream portion includes a plurality of flight portions.

According to this structure, by using a plurality of flight portions, the torque (kneading energy) of the screw increases substantially in proportion thereto, so that the kneading effect can be further enhanced.

Advantageous Effects of the Invention

In the present invention, a screw extruder including a screw having a structure that is capable of enhancing the dispersion mixing property of the kneaded material and easy to be manufactured can be provided.

DESCRIPTION OF EMBODIMENTS

Hereinafter, embodiments for carrying out the present invention are described with reference to the drawings. The screw extruder shown in the following embodiment(s) is a screw extruder with roller-die (hereinafter, referred to as "extruder with roller-die) that extrudes a kneaded material of a high-polymer such as rubber and molds into a sheet form. The screw extruder in the present invention is also usable for a machine called pelletizer that extrudes a kneaded material of a high-polymer from a die having a multiplicity of circular holes, and then, cut it into cylindrical pellets.
(Structure of the Extruder with Roller-Die)

Figure 1:
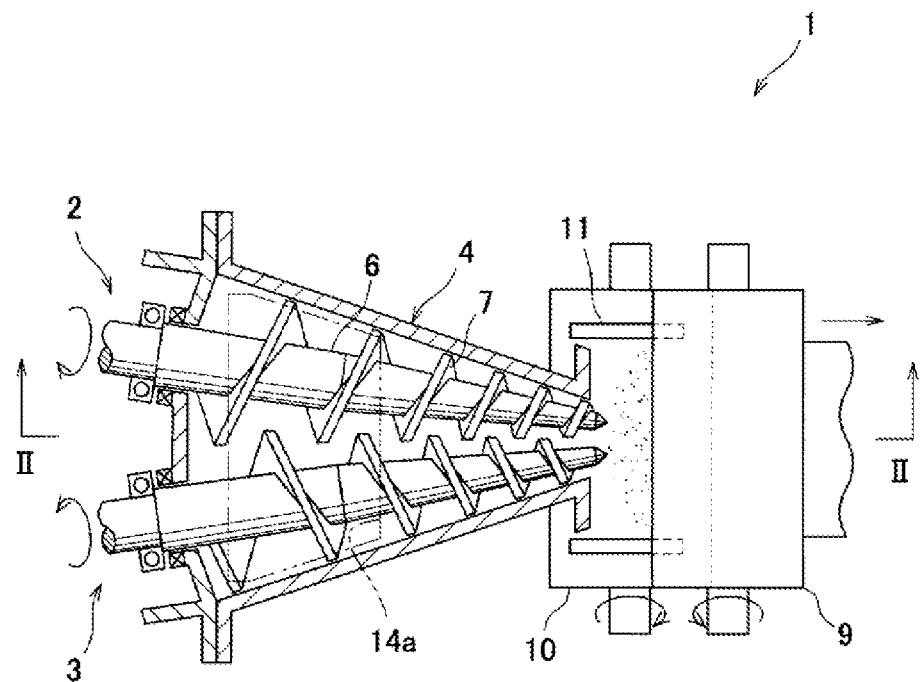
FIG. 1 A plan cross-sectional view of an extruder with roller-die as an embodiment of a screw extruder in the present invention.
Figure 2:
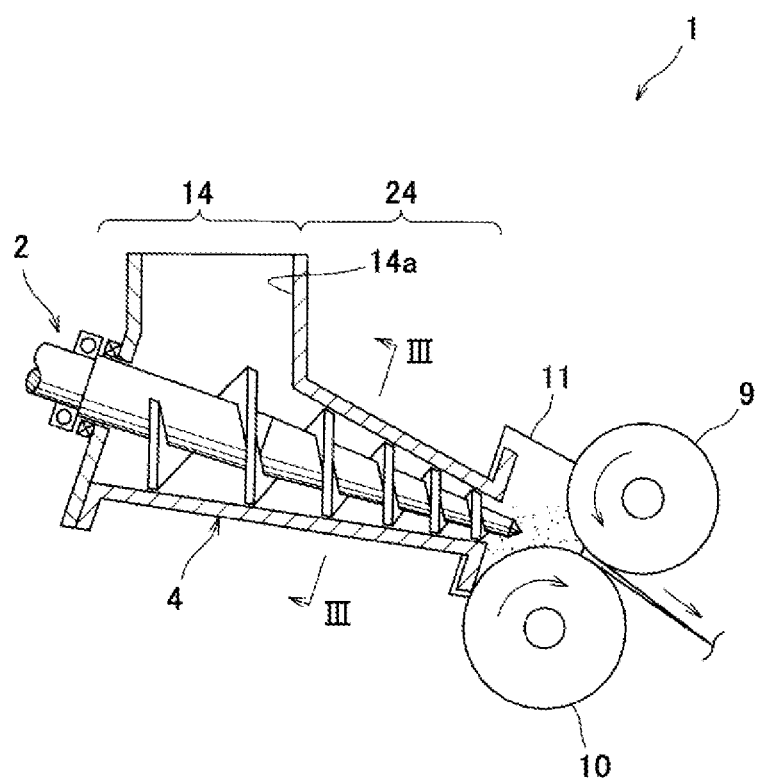
FIG. 2 A cross-sectional view of II-II in FIG. 1 and a longitudinal cross-sectional view of the extruder with roller-die in the embodiment of the present invention.
Figure 3:
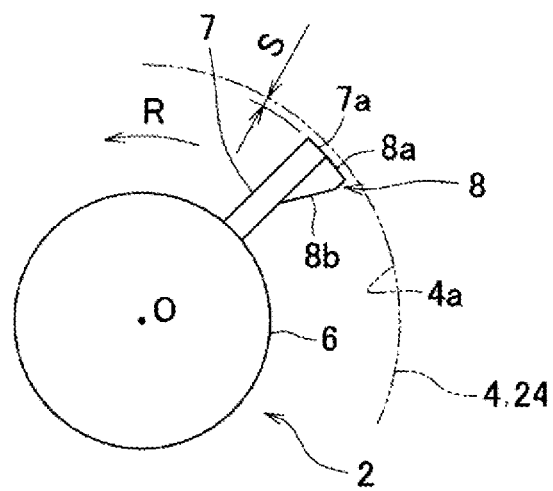
FIG. 3 A schematic cross-sectional view of a first screw side of a III-III cross-sectional view in FIG. 2.

With reference to FIG. 1 to FIG. 3, an extruder with roller-die 1 in an embodiment of the present invention is described. The extruder with roller-die 1 includes two screws (a first screw 2 and a second screw 3) that extrude a kneaded material and a chamber 4 housing the screws 2 and 3. In front of the chamber 4, a pair of upper and lower rollers 9 and 10 are disposed. Between the chamber 4 and the rollers 9 and 10, an accumulation portion 11 where the kneaded material extruded by the screws 2 and 3 accumulates is provided. The rollers 9 and 10 are coupled so as to rotate in directions opposite to each other. The rollers 9 and 10 are called a roller die.

The chamber 4 includes a chamber upstream portion 14 including, at the top, a kneaded material supply port 14a and a chamber downstream portion 24 having its periphery surrounded by a wall surface. The kneaded material such as rubber supplied to the kneaded material supply port 14a from thereabove is extruded into the accumulation portion 11 by the screws 2 and 3 rotating in directions opposite to each other, and then, is formed into a sheet form by passing it between the rollers 9 and 10.

The screws 2 and 3 are described below. Since the first screw 2 and the second screw 3 are the same screws except that the torsion angles of the flights are opposite to each other, the first screw 2 is described as a representative.

The first screw 2 includes a shaft portion 6 and a helical flight 7 provided on the outer peripheral surface of the shaft portion 6. As shown in FIG. 3, a rib 8 as a flight thickening portion is provided at a part which is a tip portion of the flight 7 and is on the reverse side of the rotation direction R of the flight 7. An outer peripheral surface 7a of the tip portion of the flight 7 and an outer peripheral surface 8a of the tip portion of the rib 8 are flush surfaces having no level difference therebetween, and are flush arc-shaped surfaces in the rotation direction R. The rib 8 may be fixed to the reverse surface of the flight 7 by welding or the like, or may be molded integrally with the flight 7. In FIG. 1 and FIG. 2, illustration of the rib 8 is omitted.

Here, as shown in FIG. 3, a part of an inner wall surface 4a of the chamber 4 (the chamber downstream portion 24) is an arc shape so that a uniform gap S is formed between the outer peripheral surface 7a of the tip portion of the flight 7 including the rib 8 and the outer peripheral surface 8a.

Moreover, a reverse surface 8b of the rib 8 is a slanting surface so that the thickness of the rib 8 continuously decreases toward the center O side of the shaft portion 6, The rib 8 (the flight thickening portion) is continuously provided on the reverse surface of the flight 7 in the rotation direction R, in a direction in which the flight 7 extends helically. That is, the rib 8 (the flight thickening portion) is a belt-like member having a shape shown in FIG. 3 in the cross-sectional shape.

The part of the flight 7 where the rib 8 is provided is disposed inside the chamber downstream portion 24 the periphery of which is surrounded by the wall surface. The rib 8 may be provided on the reverse surface of the tip portion of also the part of the flight 7 disposed inside the chamber upstream portion 14. Further, the rib 8 may be provided on the reverse surface of the tip portion of only the part of the flight 7 disposed inside the chamber upstream portion 14.

While the flight 7 is a single flight from end to end in the axial direction in the embodiment shown in FIG. 1 and FIG. 2, it is preferable that a part of the flight 7 that is inside the chamber downstream portion 24 and where the rib 8 is provided includes a plurality of flight portions, for example, two flight portions.
(Flow Analysis of the Kneaded Material)

A two-dimensional flow analysis was performed for the screw 2 where the rib 8 as the flight thickening portion was provided at a part which was the tip portion of the flight 7 and was on the reverse side of the rotation direction R of the flight 7.

Figure 4:
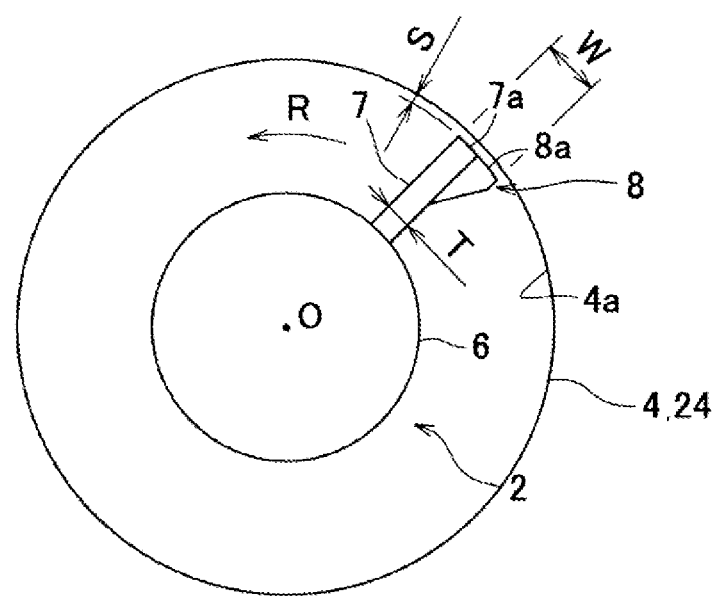
FIG. 4 A schematic cross-sectional view corresponding to FIG. 3 for explaining analysis conditions for a flow analysis.

With reference to FIG. 4, the analysis conditions for the flow analysis are described below. First, not twin screws as described above, that is, the two screws 2 and 3 but one screw 2 was housed in the chamber 4 that was circular in cross section.

The common analysis conditions were as follows:
Inner diameter of the chamber 4: D mm Diameter of the shaft portion 6 of the screw 2: 0.5 D mm Thickness T of the flight 7 of the part where the rib 8 is not provided: 0.05 D mm Number of rotations of the screw 2: 15 rpm Viscosity and density of the kneaded material: 1000 Pa·s and 1000 kg/m Regarding the flight in a comparative example (flight including, at the tip portion, no flight thickening portion) and also the flight in the present invention, the outer peripheral surface of the tip portion thereof (for the flight in the present invention, the rib portion was included) had a concentric arc shape along the arc of the inner wall surface 4a of the chamber 4.

The gap S between the flight 7 and the inner wall surface 4a of the chamber 4, the thickness W of the tip portion of the flight 7 and the filling ratio of the kneaded material inside the chamber 4 were changed, and the energy applied to the kneaded material was evaluated. The magnitude of the energy applied to the kneaded material was evaluated by the average rotation torque of the screw 2 when the screw 2 was rotated twice. The fact that the torque is high (or low) indicates that the energy applied to the kneaded material is high (or low). The analysis results are shown in Tables 1 and 2. In Tables 1 and 2, the average rotation torques of the flight under each of the conditions are represented by the ratio as the case where the average rotation torque when the gap S is 0.01 D and the filling ratio is 100% regarding the flight in the comparative example (the flight tip portion thickness W: 0.05 D) where the flight thickening portion is not provided at the tip portion is 1,000.

TABLE 1

Filling ratio: 100%

| Gap S [mm] | Thickness W of tip portion of flight [mm] | Average rotation torque [-] | |
|---|---|---|---|
| 0.01D | 0.05D | 1.000 | Comparative Example |
| 0.01D | 0.10D | 1.060 | Present Invention |
| 0.01D | 0.15D | 1.167 | |
| 0.01D | 0.20D | 1.250 | |
| 0.02D | 0.05D | 0.838 | Comparative Example |
| 0.02D | 0.10D | 0.880 | Present Invention |
| 0.02D | 0.15D | 0.912 | |

TABLE 2

Filling ratio: 90%

| Gap S [mm] | Thickness W of tip portion of flight [mm] | Average rotation torque [-] | |
|---|---|---|---|
| 0.01D | 0.05D | 0.856 | Comparative Example |
| 0.01D | 0.10D | 0.884 | Present Invention |
| 0.01D | 0.15D | 0.991 | |
| 0.01D | 0.20D | 1.213 | |

As is apparent from Tables 1 and 2, the larger the thickness W of the tip portion of the flight 7 is, the higher the average rotation torque (the energy applied to the kneaded material) is. From this, it is found that the dispersion mixing property of the kneaded material is improved by providing the rib 8 (the flight thickening portion) at the tip portion of the flight and increasing the thickness W of the tip portion of the flight.

Regarding the filling ratio of the kneaded material, from the comparison of analysis results when the gap S was 0.01 D mm in Table 1 and Table 2, it is found that the higher the filling ratio is, the higher the energy applied to the kneaded material is. From this, the use of the screw 2 where the thickness W of the tip portion of the flight 7 is large under the condition where the filling ratio of the kneaded material is high is more effective for improving the dispersion mixing property of the kneaded material. That is, the filling ratio of the kneaded material is higher in the chamber downstream portion 24 having the periphery surrounded by the wall surface than in the chamber upstream portion 14 where the kneaded material supply port 14a is provided. For this reason, as mentioned above, it is preferable that the part of the flight 7 where the rib 8 is provided be disposed inside the chamber downstream portion 24 having the periphery surrounded by the wall surface.

Further, by disposing the part of the flight 7 where the rib 8 is provided as having a plurality of flight portions (making the number of flights plural) inside the chamber downstream portion 24 where the filling ratio of the kneaded material is high, the energy applied to the kneaded material can be made higher and the dispersion mixing property of the kneaded material can be further improved.

Moreover, from the above-described flow analysis results, it has been found that in a screw in the comparative example where the flight thickening portion is not provided on the reverse side of the tip portion of the flight, the kneaded material readily accumulates on the reverse side of the tip portion of the rotating flight. When the kneaded material accumulates, cooling of the kneaded material is inhibited, so that high temperature state continues for a long time. The continuation of the high temperature state causes deterioration of the kneaded material, so that kneading quality is degraded. From this, as in the above-described embodiment (s), by the provision, on the reverse side of the tip portion of the flight, of the rib 8 (flight thickening portion) having the thickness which continuously decreases toward the center side of the screw shaft, the accumulation of the kneaded material at this portion can be prevented. Thus, the deterioration of the kneaded material can be inhibited.

Modifications

Figure 5:
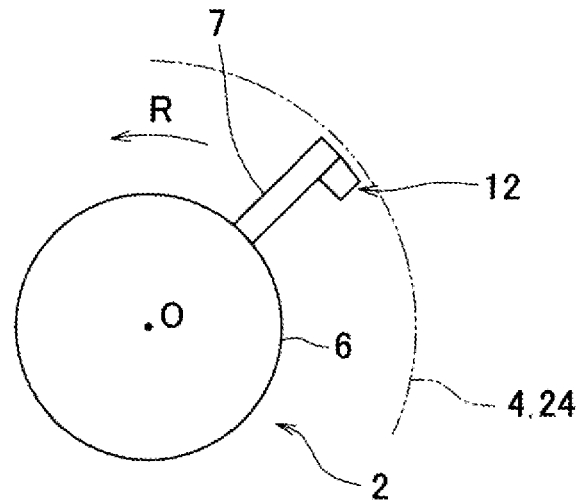
FIG. 5 A schematic cross-sectional view corresponding to FIG. 3 for showing a modification of a flight thickening portion.

FIG. 5 shows a modification of the flight thickening portion. The rib 8 as the flight thickening portion shown in FIG. 3 and FIG. 4 is formed so that the thickness of the rib 8 continuously decreases toward the center O side of the shaft portion 6 of the screw. Instead of this, it may be a rib with a substantially uniform thickness like a rib 12 (flight thickening portion) shown in FIG. 5.

Figure 6:
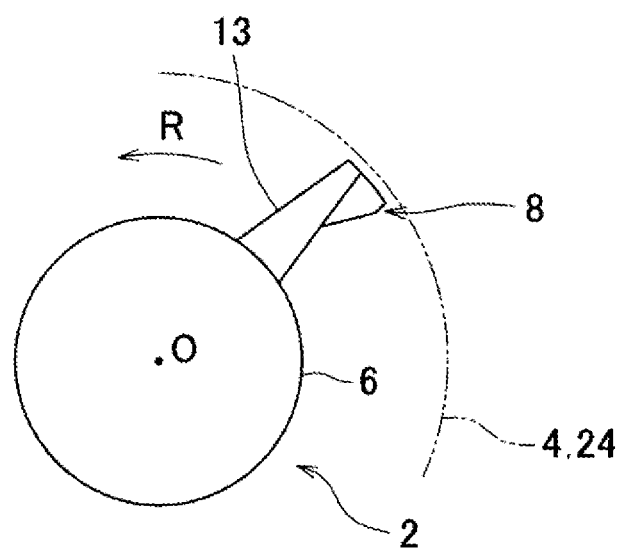
FIG. 6 A schematic cross-sectional view corresponding to FIG. 3 for showing a modification of a flight.

FIG. 6 is a modification of the flight. The thickness of the flight 7 (flight body portion) shown in FIG. 3 to FIG. 5 is uniform from the base end portion which is the center O side portion of the shaft portion 6 toward the tip portion. Instead of this, it may be a flight that is thick at the base end portion and becomes thinner from the base end portion toward the tip portion like a flight 13 shown in FIG. 6. In other words, it may be a flight that becomes thicker (increases in thickness) from the tip portion toward the base end portion. By adopting such a flight, the flight strength can be enhanced and the accumulation of the kneaded material between flights can be further prevented.

Moreover, while the outer peripheral surfaces of the tip portions of the flights 7 including the ribs 8 or 12 shown in FIG. 3, FIG. 4 and FIG. 5 are all arc-shaped in the rotation direction of the flights 7, they are not necessarily arc-shaped (the same applies to the flight 13 shown in FIG. 6). That is, the gap between the outer peripheral surface of the tip portion of the flight including the flight thickening portion and the inner wall surface of the chamber does not necessarily have uniform dimension.

While the extruder 1 with roller-die shown in FIG. 1 and FIG. 2 is a screw extruder including twin screws, that is, the screws 2 and 3, it may be a screw extruder including only one screw or may be a screw extruder including three or more screws.

In addition, various modifications may be made within the scope that one of ordinary skill in the art can arrive at.

As described above, the present invention is not limited to the above-described embodiment(s) but combining the structures of the embodiment(s) with each other, and modifications and applications by one of ordinary skill in the art based on the description of the specification and known art are also what the present invention targets and are embraced in the scope the protection of which is claimed.

The present application is based upon Japanese Patent Application No. 2016-84212 filed on Apr. 20, 2016, the contents of which are incorporated herein by reference.

DESCRIPTION OF REFERENCE NUMERALS AND SIGNS

1: Extruder with roller-die (screw extruder)
2: First screw (screw)
3: Second screw (screw)
4: Chamber
4a: Inner wall surface
6: Shaft portion
7: Flight
8: Rib (flight thickening portion)
7a, 8a: Outer peripheral surface
9, 10: Roller
14: Chamber upstream portion
14a: Kneaded material supply port
24: Chamber downstream portion
S: Gap

The invention claimed is:

1. A screw extruder which extrudes a kneaded material, comprising:
   a screw having a helical flight provided on an outer peripheral surface of a shaft portion thereof; and
   a chamber housing the screw, wherein
   a flight thickening portion is provided at a part which is a tip portion of the flight and is on the reverse side of a rotation direction of the flight;
   the flight thickening portion extends from the tip portion, along the flight toward the shaft portion, to a reverse surface of the flight thickening portion;
   the reverse surface of the flight thickening portion is disposed such that a gap is formed between the reverse surface of the flight thickening portion and the shaft portion; and
   a thickness of the flight is uniform from the tip portion to the shaft portion.

2. The screw extruder according to claim 1, wherein:
   an outer peripheral surface of the tip portion where the flight thickening portion is provided is formed in an arc shape in the rotation direction of the flight; and
   at least a part of an inner wall surface of the chamber has an arc shape so that a gap having a uniform dimension is formed between the at least a part of an inner wall surface of the chamber and the outer peripheral surface of the tip portion including the flight thickening portion.

3. The screw extruder according to claim 1, wherein the flight thickening portion decreases in thickness toward a center of the shaft portion.

4. The screw extruder according to claim 1, wherein the chamber includes:
   a chamber upstream portion including, at a top portion thereof, a kneaded material supply port; and
   a chamber downstream portion having a periphery surrounded by a wall surface, and
   wherein the part including the flight thickening portion in the flight is disposed in the chamber downstream portion.

5. The screw extruder according to claim 3, wherein the chamber includes:
   a chamber upstream portion including, at a top portion thereof, a kneaded material supply port; and
   a chamber downstream portion having a periphery surrounded by a wall surface, and
   wherein the part including the flight thickening portion in the flight is disposed in the chamber downstream portion.

6. The screw extruder according to claim 4, wherein the part of the flight disposed in the chamber downstream portion comprises a plurality of flight portions.

7. The screw extruder according to claim 5, wherein the part of the flight disposed in the chamber downstream portion comprises a plurality of flight portions.

8. The screw extruder according to claim 2, wherein the flight thickening portion decreases in thickness toward a center of the shaft portion.

9. The screw extruder according to claim 2, wherein the chamber includes:
   a chamber upstream portion including, at a top portion thereof, a kneaded material supply port; and
   a chamber downstream portion having a periphery surrounded by a wall surface, and
   wherein the part including the flight thickening portion in the flight is disposed in the chamber downstream portion.

10. The screw extruder according to claim 8, wherein the chamber includes:
    a chamber upstream portion including, at a top portion thereof, a kneaded material supply port; and
    a chamber downstream portion having a periphery surrounded by a wall surface, and
    wherein the part including the flight thickening portion in the flight is disposed in the chamber downstream portion.

11. The screw extruder according to claim 9, wherein the part of the flight disposed in the chamber downstream portion comprises a plurality of flight portions.

12. The screw extruder according to claim 10, wherein the part of the flight disposed in the chamber downstream portion comprises a plurality of flight portions.

* * * * *